March 3, 1942. R. L. BROWN 2,275,127
CLIP AND MOLDING ASSEMBLY
Filed June 21, 1940
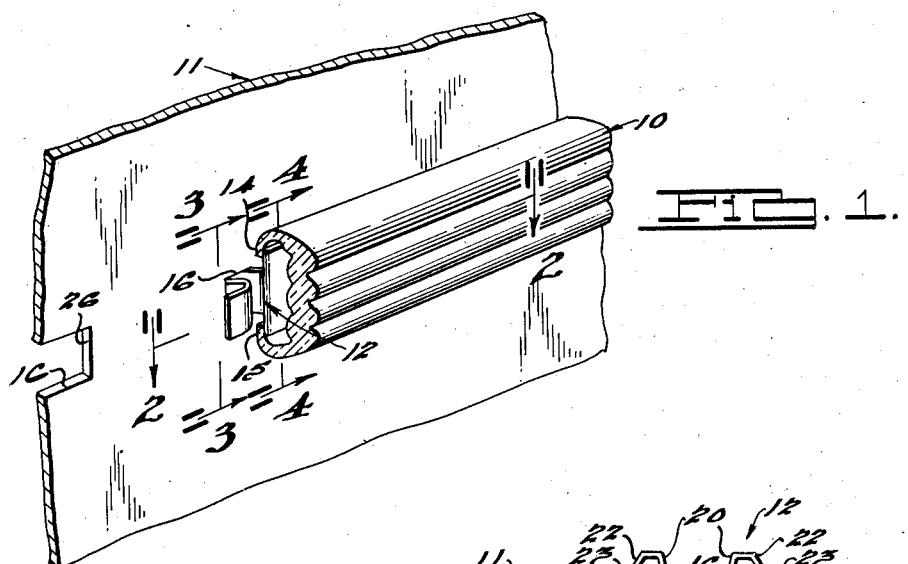
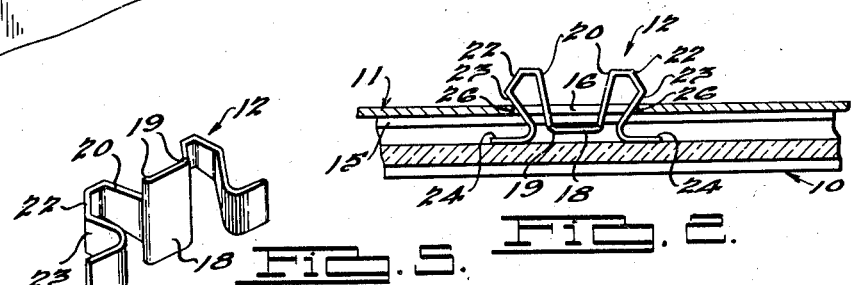
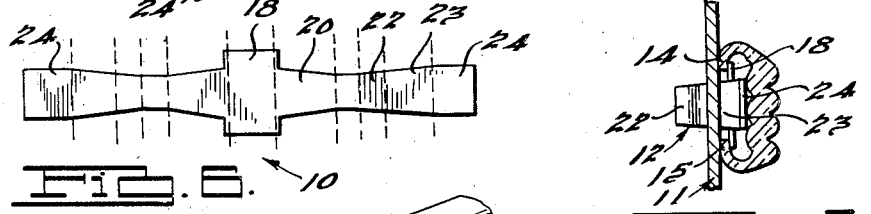
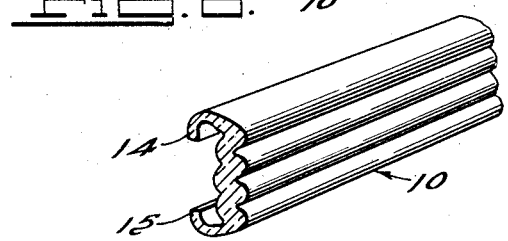
INVENTOR
Robert L. Brown
BY
Harness, Dickey & Pierce
ATTORNEYS Patented Mar. 3, 1942

2,275,127

UNITED STATES PATENT OFFICE 2,275,127

CLIP AND MOLDING ASSEMBLY

Robert L. Brown, Detroit, Mich., assignor to William R. Wiley, Detroit, Mich.

Application June 21, 1940, Serial No. 341,736

5 Claims. (Cl. 189—88)

The present invention relates to spring clips of the type used in attaching ornamental moldings to panels, and to a novel assembly of a molding strip, clip and panel.

It is the general object of the present invention to provide an improved form of clip for attaching ornamental moldings to panels characterized by its low cost and ease of assembly.

In particular, it is an object of the present invention to provide a clip which will operate successfully to secure ornamental moldings to panels, even though the space between the inturned flanges of the molding strip channel may vary to a relatively wide degree, as in the case of some moldings made from plastic materials.

These and other objects, which include the provision of an improved assembly of molding strip, clip and panel, will become apparent from the following specification, the accompanying drawing, and the appended claims.

In the drawing:

Figure 1 is a fragmentary assembly view of an assembled molding strip and panel, with parts broken away to illustrate the securing clip;

Fig. 2 is a section taken on the line 2—2 of Figure 1;

Fig. 3 is a section taken on the line 3—3 of Figure 1;

Fig. 4 is a section taken on the line 4—4 of Figure 1;

Fig. 5 is a perspective view of the clip;

Fig. 6 is a developed view of the clip with transverse dotted lines indicating the points at which the material of the clip is bent; and Fig. 7 is a fragmentary perspective view of a type of ornamental molding suitable for use in connection with the present invention.

In the drawing, there is illustrated an elongated molding strip indicated generally at 10 which is secured to a panel 11 by means of a molding clip indicated generally at 12. The molding strip which may be formed of any desired material, such as a plastic composition or extruded metal, is of general channel form provided with inturned flanges 14 and 15, as best shown in Figures 1 and 7. The panel 11 is provided with a series of spaced, rectangular holes 16, each adapted to receive a portion of one of the molding clips, as hereinafter described.

As best shown in Figures 2, 5 and 6, the molding clip, which is preferably formed of spring steel, comprises a sheet metal element bent into a general M formation. The complete clip has a central portion 18 which is of greater transverse width than the remainder of the clip, and which is adapted to fit within the molding channel and bridge across the gap between the inturned flanges 14 and 15 thereof, as best shown in Figures 3 and 4. Projecting from opposite sides of the central portion 18 are identical generally U-shaped portions of less transverse width than the central portion 18. Each of these U-shaped portions is formed of an inner leg 20 and an outer leg formed of a pair of angularly related portions 22 and 23, the portion 22 being intermediate the inner leg 20 and the portion 23 of the outer leg. The outer leg portion 23 is provided with a foot 24 adapted to engage the bottom of the molding channel, as best shown in Fig. 2.

The normal formation of the clip is such that when inserted within the molding in the manner illustrated in Fig. 2, the feet 24 on the outer leg portions 23 press downwardly against the bottom of the molding channel, thereby forcing the central portion 18 resiliently against the inner surface of the inturned flanges 14 and 15. It will be noted that, as best shown in Figures 2 and 5, the central portion 18 has its side edges 19 bent in the direction of the inner legs 20 in order to provide a sharp edge which will tend to dig into the inner surfaces of the inturned flanges 14 and 15. This tends to prevent longitudinal movement of the molding strip relative to the clip.

The clip 12 is assembled with the molding strip 10 by first compressing the outer legs 22—23 of the clip toward the central portion 18. This tends to force the central portion downwardly, as viewed in Fig. 2, or toward the plane of the foot portions 24, thus making it possible to insert the central portion 18 of the clip into the molding strip channel end-wise of the channel and slide it along the strip to the desired position. When the clip has reached the desired position along the strip, the pressure which is forcing the outer legs toward the central portions 18 is released, thus permitting the foot portions 24 to force the central portion 18 against the inturned flanges. This positively grips the strip and prevents any movement of the clip relative thereto.

After a plurality of clips 12 are secured in the manner above described in proper position along the molding strip 10, it is a simple matter to assemble the molding strip and clips with the panel 11 because all that is necessary is to position the molding strip with one clip 12 opposite each of the rectangular openings 16 in the panel, whereupon the strip is merely pressed against the panel. This causes the outer portions 22 of the outer legs to engage the ends 26 of the rectangular slots 16, thus camming the outer legs of the clip inwardly and permitting the clip to pass through the opening 16 into the position illustrated in Fig. 2. In this position the outwardly flaring portions 23 of the outer legs have passed through the opening 16 and the outer legs have sprung outwardly, gripping the end walls 26 of the opening 16 to retain the clip and molding strip against removal from the panel.

As best shown in Figures 3, 4 and 6, the portions of the clip which project through the opening 16 are somewhat tapered in order to facilitate ready insertion. It is not essential that the clip accurately fit the opening 16 in a direction parallel to the plane of the metal of the clip, because the holding action is concentrated on the end walls 26 of the opening. It is likewise unnecessary that the clip accurately fit between the inturned flanges 14 and 15 of the molding strip, since the gripping action is applied to the inner surfaces of the inturned flanges and to the bottom of the molding channel.

Any desired means may be utilized to assemble the clips in the molding. One suitable apparatus and method for effecting such assembly is disclosed in applicant's copending application, Serial No. 341,737, filed June 21, 1940.

The clip of the present invention is exceedingly simple and inexpensive to manufacture, yet is quite effective for the purpose intended and is peculiarly advantageous as compared with prior clips for the same purpose in that it does not depend for its action on an accurate fit between the clip and the molding or between the clip and the opening in the panel.

While only one embodiment of the invention is illustrated and described, it is apparent that others are available within the spirit of the invention and within the scope of the following claims.

What is claimed is:

1. A clip for securing a molding strip of channel shape with inturned flanges to a panel having an opening therein, said clip comprising a sheet metal element of spring steel having a central portion adapted to fit within the molding channel and bridge transversely across the space between the inturned flanges of the channel, a pair of generally U-shaped portions extending from opposite sides of said central portion and adapted to project out of said molding channel, each of said U-shaped portions having an inner leg connected to the central portion, an outer leg adapted to resiliently engage the bottom of the molding channel in order to force the central portion against the inner surfaces of the inturned molding channel flanges and an intermediate portion adapted to project through the panel opening.

2. A clip for securing a molding strip of channel shape with inturned flanges to a panel having an opening therein, said clip comprising a sheet metal element of spring steel having a central portion adapted to fit within the molding channel and bridge transversely across the space between the inturned flanges of the channel, a pair of generally U-shaped portions extending from opposite sides of said central portion and adapted to project out of said molding channel, each of said U-shaped portions having an inner leg connected to the central portion, an outer leg adapted to resiliently engage the bottom of the molding channel in order to force the central portion against the inner surfaces of the inturned molding channel flanges, and an intermediate portion adapted to project through the panel opening, the inner legs of the U-shaped portion extending at such an angle to the plane of the outer extremities of the outer legs that the application of a force to the outer legs in a direction toward the central portion tends to shove the central portion toward said plane.

3. A clip for securing a molding strip of channel shape with inturned flanges to a panel having an opening therein comprising a spring steel element having a central portion and free extremities adapted to fit within and grip said channel and a U-shaped portion intermediate each extremity and the central portion adapted to project from said channel and engage the panel opening, said clip when subject to a compressing force in a direction in line with the molding strip being adapted to release its grip on said molding strip and thereby permit free sliding of said first mentioned clip portions in said channel, the outer legs of the U-shaped portions being adapted to grip the panel opening by spring tension in a direction outwardly from the central portion.

4. A clip for securing a molding strip of channel shape with inturned flanges to a panel having an opening therein comprising a spring steel element having a central portion and free extremities adapted to fit within and grip said channel and a U-shaped portion intermediate each extremity and the central portion adapted to project from said channel and engage the panel opening, the outer legs of the U-shaped portions being adapted to grip the panel opening by spring tension in a direction outwardly from the central portion and the inner legs of the U-shaped portion extending at an angle to the plane of the outer extremities of the outer legs so that the application of a force to the outer legs in a direction toward the central portion tends to shove the central portion toward said plane and thereby release the grip of said clip in said channel.

5. In combination a molding strip of channel shape with inturned flanges, a panel having a plurality of openings therein, and a plurality of spring steel clips for securing said molding strip to said panel, each of said clips having a central portion bridging transversely across the space between the inturned flanges of the molding within the channel and a pair of generally U-shaped portions extending from opposite sides of said central portion and projecting out of the molding channel into said panel opening, each of said U-shaped portions having an inner leg connected to the central portion, an outer leg having its extremity resiliently engaging the bottom of the molding and thereby forcing the central portion against the inner surface of the inturned molding channel flanges and an intermediate portion projecting through the panel opening.

ROBERT L. BROWN.